United States Patent [19]
Yuan

[11] Patent Number: 5,236,555
[45] Date of Patent: Aug. 17, 1993

[54] APPARATUS FOR CONCENTRATION OF LIQUIDS

[75] Inventor: Wallace I. Yuan, Irvine, Calif.

[73] Assignee: Athens Corp., Oceanside, Calif.

[21] Appl. No.: 783,632

[22] Filed: Oct. 24, 1991

Related U.S. Application Data

[62] Division of Ser. No. 648,543, Jan. 29, 1991.

[51] Int. Cl.⁵ ............................................. B01D 3/14
[52] U.S. Cl. ................................... 202/153; 202/158;
    202/176; 202/181; 202/202; 202/234; 202/235;
    203/1; 203/3; 203/39; 203/DIG. 9; 203/DIG.
    25; 210/96.1; 210/114
[58] Field of Search ............... 202/153, 158, 176, 181,
    202/234, 235, 168-170, 202; 203/39, DIG. 9,
    DIG. 11, 1, 3, DIG. 25; 210/96.1, 114, 104

[56] References Cited

U.S. PATENT DOCUMENTS

| | | |
|---|---|---|
| 1,870,854 | 8/1932 | Lewis . |
| 2,553,469 | 5/1951 | Pellettere . |
| 2,591,010 | 4/1952 | Rollins et al. . |
| 2,856,331 | 10/1958 | Rosenthal et al. . |
| 2,900,312 | 8/1959 | Gilmore . |
| 2,903,401 | 9/1959 | Heere . |
| 3,189,530 | 6/1965 | Orr . |
| 3,340,157 | 9/1967 | Weiss . |
| 3,489,649 | 1/1970 | Weiss . |
| 3,663,375 | 5/1972 | Witheford . |
| 3,966,602 | 6/1976 | Burger ............................ 210/96.1 |
| 4,071,398 | 1/1978 | Baierl . |
| 4,664,754 | 5/1987 | Caputi et al. . |
| 4,828,751 | 5/1989 | Kremer . |
| 4,936,555 | 6/1990 | Dobson et al. . |
| 4,980,032 | 12/1990 | Dobson et al. . |

OTHER PUBLICATIONS

Marketing Pamphlet: Towel Vapor Drying System: Athens Corp.; May 1988.

Jones, et al. A New Vapor Drying Technology Addressing Contamination, Environmental and Safety Issues. Presented Mar. 7-9, 1989; Zurich.

Primary Examiner—Wilbur Bascomb, Jr.
Attorney, Agent, or Firm—Knobbe, Martens, Olson & Bear

[57] ABSTRACT

The invention relates to a distillation method and an apparatus for the concentration and purification of water-containing liquid chemicals. The distillation is performed using constant, predetermined distillation parameters.

24 Claims, 2 Drawing Sheets

APPARATUS FOR CONCENTRATION OF LIQUIDS

This application is a divisional of application Ser. No. 07/648,543, filed Jan. 29, 1991.

FIELD OF THE INVENTION

The present invention relates to a method for the concentration of liquids. More particularly, the invention concerns a method for the regeneration and purification of liquid chemicals containing water, using a simple and efficient distillation process.

BACKGROUND OF THE INVENTION

In a variety of technologies involving the use of liquid chemicals the elimination of water and associated impurities is necessary before such chemicals can be reused. For example, a number of technologies use large volumes of solvents and solvent mixtures for drying. Thus, in the manufacturing process of electronic and semiconductor devices, parts, such as integrated circuit wafers and printed circuit boards must be water-rinsed between subsequent steps of fabrication. Since these parts are extremely sensitive to impurities, water-rinsing must be followed by quick and efficient drying to avoid the formation of drying stains on their surfaces, which would adversely effect the performance of the target devices.

According to a widely used procedure, the water and associated dissolved and particulate impurities are removed by vapor drying with a liquid solvent or solvent mixture. For this purpose, large quantities of organic solvents and solvent systems are used.

After drying, the used organic solvents contain varying amounts of water and (dissolved and undissolved) impurities, and are normally disposed of as waste.

Whereas traditionally isopropyl alcohol (IPA) and Chloro-Fluoro-Carbons (CCFC's) were the choice of solvents for vapor drying, due to the potential fire hazard associated with the former one, and the ban on CFCs, the focus is more and more on the development of new solvents and solvent systems. Most of these are rather expensive, and potentially health hazardous, therefore, their discharge poses serious environmental problems. It is, therefore, highly desirable to have a system suitable for the safe, efficient regeneration of such solvents, including those containing two or more phases.

The object of the present invention is to provide a method for the regeneration and purification of water-containing liquids, such as solvents and solvent systems, in particular of used vapor drying solvents.

Another specific object of this invention is to provide a novel apparatus for the regeneration and purification of such liquids, in particular of used vapor drying solvents.

SUMMARY OF THE INVENTION

The present invention relates to methods and apparatus for the regeneration and purification of water-containing liquid chemicals.

In one aspect, the invention concerns a method for the concentration of a liquid containing water by distillation, comprising using constant, predetermined distillation parameters.

In a preferred aspect, the invention concerns a method for the concentration and purification of a multi-phase solvent system, at least one phase of which contains water, comprising separating the phases of the multi-phase solvent system; and distilling the phases sequentially in one distillation column, using constant distillation parameters predetermined for each phase separately.

In another aspect, the present invention relates to an apparatus for the concentration and purification of a multi-phase solvent system, at least one phase of which contains water, comprising a distillation apparatus, a first container for holding the multi-phase solvent system, means for separating the phases of the multi-phase solvent system, second containers for holding the phases separated, means for adjusting the water content of the water-miscible phases, conduits connecting the first container to the second containers, and the second containers to the distillation apparatus, means for forwarding the phases or a mixture thereof into the distillation apparatus, and means for withdrawing distillate from said distillation apparatus.

In a still further aspect of the invention, there is provided a reflux condenser comprising a cooling means, means for joining said reflux condenser to a distillation column, a distillate reservoir and an overflow weir positioned in the lower portion of said reflux condenser, and a distillate withdraw port at the bottom of said distillate reservoir, said cooling means having sufficient area for total condensation of a vapor entering the reflux condenser.

DETAILED DESCRIPTION OF THE INVENTION

Figure 1:
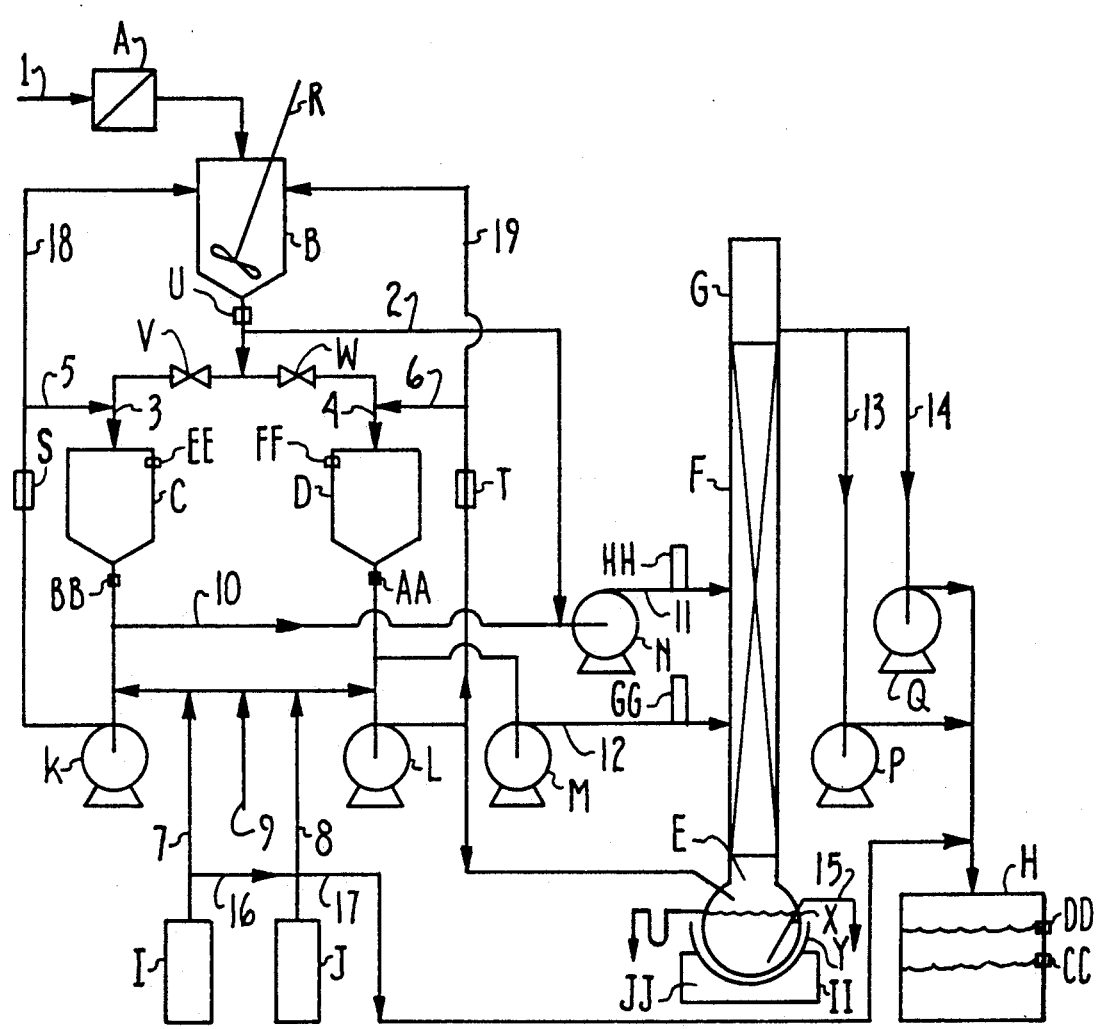
FIG. 1 depicts a preferred apparatus used in the present invention.

The present invention relates to a distillation method and an apparatus for regeneration of water-miscible liquids, and in particular, of solvent systems comprising at least one water-miscible solvent by purification of multi-phase solvent systems.

The method of the present invention is specific in that the operation parameters are predetermined and preset for a certain task and are maintained substantially constant during the entire operation. Similarly, whereas the units of the apparatus remain essentially the same, the apparatus can be adapted to the requirements of each particular application.

The concept of the present invention, i.e. the predetermination and presetting of distillation parameters, and the performance of the distillation under such predetermined steady conditions, is broadly applicable to a variety of applications, including, but not limited to the removal of water from solvents or solvents systems. For example, inorganic chemicals, such as sulfuric acid may be concentrated using essentially the same principles. Accordingly, the term "liquid" is used in the broadest sense to cover both organic and inorganic liquid chemicals and their mixtures. Such liquids may be in the form of a single phase or as multi-phase systems.

The disclosed method is particularly suitable for the regeneration of solvent systems, including single-phase solvents and multi-phase solvent mixtures, used for drying. Subsequent to their use, such solvent systems contain varying amounts of water. The objective of the regeneration method and apparatus of the present invention is the removal of accumulated water and (dissolved and/or particulate) impurities from a used solvent system to restore its drying capability and purity for its specific application.

Although the method according to the present invention is equally applicable for the purification of single solvents and solvent mixtures, its advantages are most apparent when the used solvent is a multi-phase solvent mixture.

The term "multi-phase" is used to describe liquids which separate to more than one phase upon standing, and therefore, includes two-phase liquids.

The term "solvent system" as used herein includes water-miscible and water-immiscible organic solvents and solvent mixtures. Since the primary use of the solvent system to be regenerated by the method of the present invention is drying, at least one of the solvents must be water-miscible.

The term "water-immiscible" is used in a broad sense and includes solvents with limited water-solubility.

The solvents used for vapor drying, especially in the semiconductor industry, are chosen to be non-reactive with respect to the articles to be vapor dried. They should dry quickly by evaporation without leaving any residue on the surface dried.

A variety of single solvents may be used for this purpose, including halogenated hydrocarbons or various alcohols, which have a boiling point less than 100° C. The halogenated hydrocarbons include chloro-hydrocarbons, fluoro-hydrocarbons, and chloro-fluoro-hydrocarbons. As a typical representative of fluoro-hydrocarbons Per-fluoro-heptane, and as a preferred chloro-fluoro-hydrocarbon Freon can be mentioned. The alcohols suitable for drying purposes include methanol, ethanol, n-propanol, i-propanol, n-butanol, i-butanol, and halogenated derivatives of such alcohols. A typical halogenated alcohol in this category is, for example, 2,2,2-trifluoroethanol.

These compounds individually have a variety of excellent vapor drying solvent properties, but suffer from several drawbacks, such as extreme flammability or immiscibility with water. Therefore, solvent mixtures are preferred. A two-phase solvent system may, for example, contain an alcohol, aldehyde, or ketone component in admixture with a halogenated hydrocarbon. A preferred system to be used for vapor drying of various articles may comprise a proportion of each an alcohol and a separate hydrocarbon; preferably a halogenated alcohol and a halogenated hydrocarbon. Such solvent systems will preferably have a low heat of vaporization. The heat of vaporization will preferably be less than about 50 kJ/mole, allowing for a more expeditious drying of the product material due to the lower temperature of the product material, and most preferably the fluorinated alkyl hydrocarbon will be greater than 10% by weight of the total mixture to prevent flash hazard at the boiling point. In such solvent systems, depending on the intended use, the presence of varying amounts of water may be tolerated.

In use, this solvent system may, for example, comprise the components: (a) of about 8 parts to about 90 parts by weight of a haloalkyl hydrocarbon containing from 1 to 12 carbon atoms, (b) from about 8 to 90 parts by weight of a partially or totally fluorinated alcohol containing from 2 to 4 carbon atoms, and (c) from about 2 to 10 parts water, the total of components (a), (b) and (c) being about 100 parts by weight. Generally, these haloalkyl hydrocarbons and alcohols will be perhalogenated, most preferably with fluorine.

Preferably, the fluoroalkyl hydrocarbon of the solvent system is perfluoroheptane, and the fluorinated alcohol is triflouroethanol. The boiling point of the solvent system is most preferably in the range from about 40° C. to less than 100° C. If the boiling point of the solvent system is too low, the heating from the vapor and other points in the vapor drying apparatus may raise the temperature of the article to be vapor dried to the boiling point of the solvent and the vapor condensation on the article will stop too early. Conversely, too high of a boiling point of the solvent system may cause the organic or inorganic liquids on the article and their associated particulate matter to evaporate before the solvent vapor is condensed, thereby leaving a stain residue on the article as a contaminant.

The articles which are typically vapor dried with such solvent systems include a variety of metallic and non-metallic materials. Such metallic materials include, for example, copper, nickel, stainless steel, aluminium, ferrous metals and alloys thereof. The non-metallic materials present typically are semiconductors, e.g. silicon, or compound semiconductors, e.g. gallium arsenide, gallium aluminium arsenide, etc., glass and plastic materials.

The used solvents to be regenerated according to the present invention contain varying amounts of water and may contain additional impurities either dissolved, or as discrete, dispersed particles. The dissolved and particulate impurities are usually originated from the articles dried. Such further impurities are typically dissolved in the aqueous phase of the used solvent system. The water-content in the used solvent systems to be regenerated has no theoretical upper limit, however, generally it is not economically feasible to dry with solvents containing more than about 50% water.

In a two phase solvent system, the volume ratio of the higher-density and the lower-density phases is preferably between about 1:6 and about 6:1, more preferably between about 1:6 and about 3:1, most preferably between about 1:3 and 3:1.

There is a variety of parameters that are variable in a commonly used distillation apparatus, including the height of the distillation column, the feed rate, the feed composition, the product rate, the product composition, the reflux ratio, and the boiler heat. According to the process of the present invention, these parameters are preset for each particular application, and their variability is minimized or eliminated for the entire operation.

The feed rate primarily depends on the solvent usage, and on how frequently a solvent system needs to be regenerated before it reaches the upper limit of its permissible water content.

The product rate is essentially determined by the feed rate and the water content, whereas the difference of the feed rate and product rate gives the waste rate.

By preadjusting the water content of the water-miscible phase(s) to be distilled as to provide a constant water composition, the feed rate of the solvent into the specifically designed distillation column and the heating power input of the distillation column, a fixed product rate with a fixed water-content is achieved. The predetermined water content of the feed is a function of the intended application. The highest permissible water concentration in the feed is the one that can be still tolerated by the intended drying application.

Further details of these aspects of the invention will be more apparent from the discussion of a specific embodiment adapted to the distillation of a two-phase solvent system, as discussed hereinbelow.

For most purposes, the process of the present invention can be performed continuously. The term "continuous" is used to described steady operation conditions. However, if one of the phases is water-immiscible, the distillation of a water-immiscible phase may be performed batchwise, to save equipment costs.

In another aspect, the present invention relates to an apparatus for the purification of a multi-phase solvent system, at least one phase of which contains water, comprising
 a distillation apparatus,
 a first container for holding said multi-phase solvent system,
 means for separating the phases of said multi-phase solvent system,
 second containers for holding the phases separated,
 means for determining and adjusting the water content for each of the water-containing phases,
 conduits connecting said first container to said second containers, and said second containers or said first container to said distillation apparatus,
 means for forwarding said phases or a mixture thereof into said distillation apparatus, and
 means for withdrawing distillation from said distillation apparatus.

FIG. 1 depicts a preferred apparatus used in the solvent purification and regeneration process of the present invention. This apparatus comprises a submicron filter A to remove most submicron size particulate impurities from the used solvent system. This is attached via a conduit 1 to the settling tank B, equipped with a stirrer R. The settling tank is connected to holding tanks C and D via conduits 3, and 4, respectively. A sensor U that is able to differentiate a heavy phase chemical from a light phase chemical is installed next to the drain line of the settling tank B. Such sensor may, for example, be a conductivity meter, a densitometer, a reflective index meter, an optical sensor or a capacitance sensor, the latter one being preferred. The sensor is associated with a means responsive thereto in the conduit. Such means may, for example, be solenoid valves V and W that stop the flow into the holding tank C as the interface between the higher density phase and the lower density phase is detected, and directs the flow of the second, i.e. the lower density phase into holding tank D. The holding tanks C and D may have associated with them sensors S and T capable of monitoring the water-content of the solvents contained in the respective holding tanks. Such sensors may comprise a conductivity meter, a reflective index meter or, preferably, an on-line densitometer capable of constant monitoring of the water concentration during the water content adjustment step until it reaches the desired, preset value. The holding tanks C and D are connected with mixing pumps K and L, respectively which enable mixing during the water-adjustment process, and their outlets are connected with pumps N and M (that may optionally have associated flow meters GG and HH, respectively, or may be metering pumps), for feeding the liquids from the holding tanks into the distillation column F at their preset flow rates. The outlets of the holding tanks C and D are also connected with holding tank B, enabling the recycling parts or all of the phases contained therein. The distillation column F comprises a reboiler E and a reflux condenser G, and its outlet is connected with the product tank H via conduits 13 and 14, including the metering pumps P and Q, respectively.

A used two-phase solvent from the previous drying stage passes through the submicron filter A to remove most particles before entering the settling tank B. After some time, this solvent is clearly separated inside the settling tank B into two phases by the difference in their densities. The heavy phase chemical drains first into its holding tank D from the bottom of settling tank B through conduit 4 with valve W open. The sensor U that is able to differentiate the heavy phase chemical from the light phase chemical is installed next to the drain line of tank B. As soon as it senses the light phase chemical, this light phase liquid coming out of tank B is immediately diverted to its holding tank through conduit 3 by closing valve W and opening valve VC.

Once all the heavy phase chemical drains from settling tank B to holding tank D, it is ready for its water-content adjustment. The correct water concentration is determined by the previous drying application, and the adjustment is carried out by determining water content with sensor T and by adding deionized water from conduit 9 or by adding the heavy-phase chemical from its make-up drum J with the mixing pump L on. A conductivity meter, a reflective index, meter or preferably, an on-line densitometer is used for sensor T to constantly monitor the water concentration during this water-content adjustment step until it reaches the preset value.

The heavy phase chemical with the correct water content feeds continuously into the distillation column F through conduit 12 at the preset flow rate controlled by the pump M and a flow meter GG. Pump M is preferably a metering pump without a flow meter. The column is designed to achieve good separation of the solvent from the water and impurities, as well as particles with the reflux condenser G as the key element Column F can be a plate type distillation column.

However, a packed distillation column is preferred because of its process flexibility as well as its established performance on particle removal. Any conventional packing, including Lessing rings, Berl saddles, spiral partition rings, grid packing or, perefably, Raschig rings may be employed.

The regenerated ultra-pure heavy phase chemical leaves the reflux condenser G and flows at the preset rate, controlled by a needle valve or, preferably, by a metering pump P into product tank H. The reflux flow rate within the column is fixed by the difference between the heavy phase chemical product rate and the boil up rate, i.e. the heating power of reboiler E.

The waste stream, which is essentially water carrying dissolved or particle impurities, is constantly purged out of reboiler E through dip tube 15 to drainage, and the high and low level sensors X and Y for this reboiler control the purging operation. For this purpose optical sensors are preferred. The average flow rate of this waste water stream is the difference between the feed rate to the column and the product rate out of reflux condenser G. As an option, this water waste stream may continuously overflow out through conduit 18, which may be provided with a "U"-shaped liquid seal. Heating power may be provided to the reboiler E by direct heating means, such as an electric heater II, or indirect heating means, such as passing steam or hot oil through jacket JJ around the reboiler E.

Few minutes after the optical sensor M located at the bottom of the holding tank D indicates that the tank is empty, all heavy phase chemical is processed and collected in tank H. With the pre-calibrated high and low level sensors, DD and CC, respectively on the tank, pure heavy chemical flows from its make-up drum J to bring up the amount of heavy chemical required for drying. At this point, it is ready for regenerating the light phase chemical.

Once all the light phase chemical drains from settling tank B, it is regenerated in the same distillation column through water content adjustment, distillation, and product make-up steps similar to those steps for the heavy phase chemical described above. However, its water content, feed location on the column, feed rate, boil-up rate, the product rate, and the allowable water-content in the product, as well as its required amount for drying could be different from those for the heavy phase chemical.

For most two-phase solvents, one of the two phases, either the heavy phase chemical or the light phase chemical, is not miscible with water. Then, this water-immiscible chemical is regenerated without the water content adjustment step but feeding directly into the distillation column. In order to save the equipment cost, its regeneration can be a batch operation by feeding it directly to the boiling pot E and the batch cycle, is controlled by the high and the low level sensors X and Y on the reboiler.

For some reasons, avoiding potential fire hazard as an example, a two-phase solvent may have to be regenerated at the same time. For this case, during the water content adjustment step, each phase chemical has to be adjusted not only to its preset water content but also to its preset amount with a pre-calibrated level sensors (i.e., high level sensors EE and FF or low level sensors AA and BB, respectively on each holding tank C or D. Then pump all the chemicals from both holding tanks C and D back to settling tank B and get them well mixed. With the mixer R on, this well-mixed two phase solvent flows continuously into the distillation column at the preset flow rate and the two-phase ultra-pure product continuously flows into the product tank at its preset rate with the waste water stream being constantly purged out. Few minutes after settling tank B is empty, the regeneration of the two-phase solvent is completed without further make-up step.

The process and apparatus disclosed in this patent is not limited only for two-phase solvent. It can easily be modified for single phase or for multiple phases solvents by eliminating one or by adding more holding tanks and metering pumps.

In a still further aspect of the invention, there is provided a reflux condenser comprising
a cooling means,
means for joining said reflux condenser to a distillation column,
a distillate reservoir and an overflow weir positioned in the lower portion of said reflux condenser, and
a distillate withdraw port at the bottom of said distillate reservoir,
said cooling means having sufficient area for total condensation of a vapor entering the reflux condenser.

Figure 2:
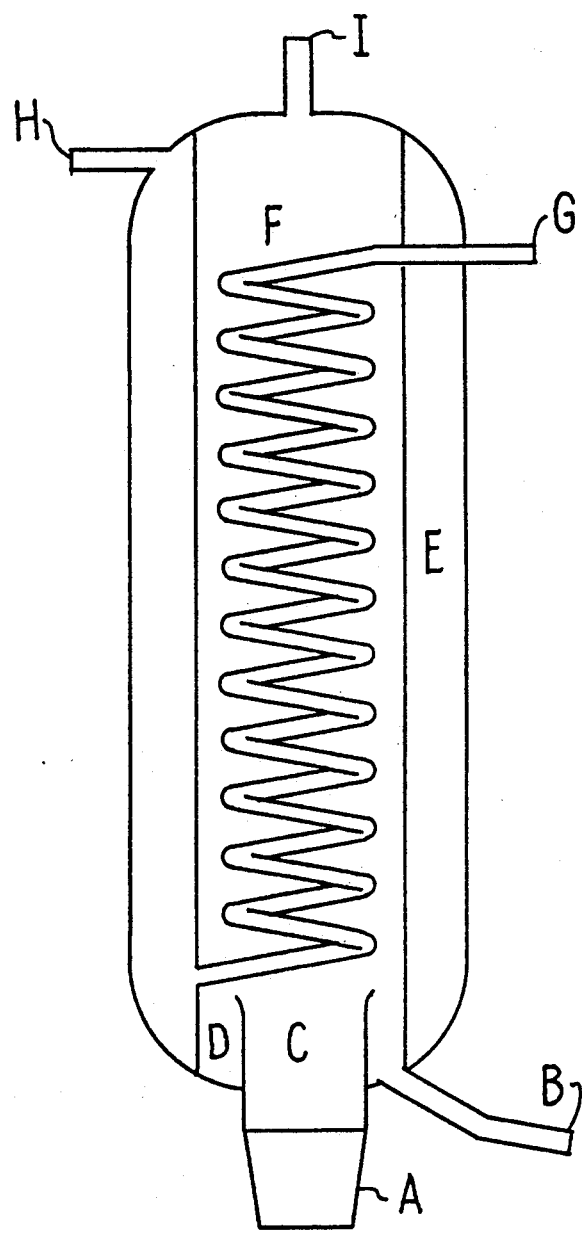
FIG. 2 illustrates a reflux condenser used with a distillation column in performing the process of the present invention.

The reflux condenser is a key element of the distillation column for regenerating ultra-pure solvent and FIG. 2 discloses the details of its design. Cooling coil F and cooling jacket E provide the required cooling area for total condensation of all the vapor coming out of the distillation column through joint A. Nearly all the condensate is collected in the distillate reservoir D. Through distillate withdraw port B located near the bottom of the reservoir, the distillate continuously flows out at the preset rate (via a metering pump). For the rest of the condensate, it overflows from the reservoir back to the distillation column as the reflux stream. Vent I located at the top avoids pressure building up in the distillation column. Since the reflux condenser disclosed above, has no moving parts and provides the most steady operation, it is a critical key element for producing ultra-pure chemicals.

The present invention is further illustrated by the following non-limiting examples.

The distillation column for both examples was a 2 inches in inside diameter and 7 feet total height column packed with ¼" quartz Raschig rings with two 700 watts heating circuits.

EXAMPLE 1

Used Solvent

Heavy Chemical—1 liter of Perfluoroheptane(PFH), water immiscible.

Light Chemical—6 liters of 2,2,2-trifluoroethanol (TFE) with 50% by volume of water content after water content adjustment step.

Operating Mode

With water in the reboiler, processed the heavy chemical through batch distillation then the light chemical through continuous distillation.

| Process Conditions and Results: | | |
|---|---|---|
| | PFH | TFE |
| Power, Watts | 700 | 1400 |
| Feed Rate | 300 ml/batch | 10 ml/min |
| Product Rate | 25 ml/min | 5 ml/min |
| Reboiler Temp., °C. | 82 | 101 |
| Reflux Temp., °C. | 71 | 78 |
| Product | Phase Ratio of | 95% wt. TFE |
| | PFH/Water = 32 v/v | 5% wt. Water |
| Waste Water | None | 1% vol. TFE |

EXAMPLE 2

Used Solvent

Heavy chemical—3 liters of Perfluoroheptane(PFH).

Light Chemical—2 liters of 2,2,2-trifluoroethanol (TFE) with 50% by volume of water after water content adjustment step.

Operating Mode

After water content adjustment, both light and heavy chemicals were pumped back to the settling tank. With the stirrer on, the well mixed two phase chemical was distilled continuously.

| Process Conditions and Results: | |
|---|---|
| Power, Watts | 700 |

-continued

| Process Conditions and Results: | |
|---|---|
| Feed Rate | 10 ml/min |
| Product Rate | 8 ml/min |
| Reboiler Temp., °C. | 70 to 100 |
| Reflux Temp., °C. | 60 to 70 |
| Product | Light Phase: 90% TFE by volume |
| | Heavy Phase: Pure PFH |
| | Phase Ratio: Heavy/Light = 2.7 |
| Reboiler Waste | Water with 5% TFE by Volume and trace amount of PFH |

The foregoing description details specific methods and specific equipments that can be employed to practice the present invention, and represents the best mode contemplated. However, it is apparent for one of ordinary skill in the art that modifications are possible without departing from the essence of the invention. For example, although the method of the present invention is specifically illustrated with respect to multi-phase organic solvent systems, it is equally suitable for the purification of single phase organic and inorganic liquids containing water. Similarly, the distillation apparatus can be easily adapted to specific requirements, such as the concentration of liquids wherein the product liquid is less volatile than water, and therefore the concentrated liquid should be removed from the bottom of the distillation column. Thus, however detailed the foregoing may appear in text, it should not be construed as limiting the overall scope hereof; rather, the ambit of the present invention is to be governed only by the lawful construction of the appended claims.

I claim:

1. An apparatus for the concentration and purification of a multi-phase solvent system, at least one phase of which contains water, comprising
   a distillation apparatus,
   a first container for holding said multi-phase solvent system,
   means for separating the phases of said multi-phase solvent system,
   second containers for holding the phases separated,
   means for determining and adjusting the water content for each of the water-containing phases,
   conduits connecting said first container to said second containers, and said second containers or said first container to said distillation apparatus,
   means for forwarding said phases or a mixture thereof into said distillation apparatus, and
   means for withdrawing distillate from said distillation apparatus.

2. The apparatus of claim 1 wherein the first container further comprises a first conduit for transferring the multi-phase solvent system from said first container to said second containers, and wherein said means for separating the phases of said multi-phase solvent system includes a sensor to determine when each phase has been completely transferred from said first container.

3. The apparatus of claim 2 wherein said sensor is selected from the group consisting of conductivity meter, densitometer, reflective index meter, optical sensor and capacitance sensor.

4. The apparatus of claim 3 wherein said sensor is a capacitance sensor.

5. The apparatus of claim 2 wherein said sensor is located on the first conduit adjacent to said first container.

6. The apparatus of claim 1 further comprising solenoid valves or pneumatic valves controlled by solenoid valves in the first conduit between said first container and said second containers.

7. The apparatus of claim 6, further comprising a sensor for determining when each phase has been transferred from said first container wherein said solenoid valves are controlled by the sensor.

8. The apparatus of claim 1 wherein at least one of said second containers is equipped with a mixer.

9. The apparatus of claim 8 wherein said mixer is a circulating pump located underneath at least one of said second containers said pump having a suction side which is adapted to introduce a fluid into said second container, wherein said fluid is water or the solvent system such that the water concentration is increased or decreased, accordingly.

10. The apparatus of claim 1 wherein said means for determining the water content are selected from the group consisting of a conductive meter, a pH meter, a hydrometer, a reflective index meter and a densitometer.

11. The apparatus of claim 10 wherein said means is a densitometer.

12. The apparatus of claim 1 wherein said distillation apparatus further comprises at least two feed locations for introducing the different phases from the second containers to be distilled.

13. The apparatus of claim 1 wherein said distillation apparatus comprises a packed distillation column.

14. The apparatus of claim 13 wherein said column is packed with Lessing rings, Berl saddles, spiral partition rings, grid packing or Raschig rings.

15. The apparatus of claim 14 wherein said packing is Raschig rings.

16. The apparatus of claim 1 wherein said distillation apparatus comprises a distillation column with distillation plates.

17. The apparatus of claim 1 wherein said distillation apparatus comprises a reboiler and an overflow conduit with an U-shaped liquid seal or a dip tube for purging out the waste water and impurities from said reboiler.

18. The apparatus of claim 17 wherein said dip tube is controlled by a timer or a high level sensor and a low level sensor on said reboiler.

19. The apparatus of claim 18, further comprising means for forwarding a water-immiscible phase from one of the second containers to the distillation apparatus, wherein said high level sensor and said low level sensor control the the forwarding means.

20. The apparatus of claim 1 wherein said means for forwarding said phases or a mixture thereof into said distillation apparatus and said means for withdrawing distillate from said distillation apparatus are selected from the group consisting of pumps with flow meters and metering pumps.

21. The apparatus of claim 17 wherein said reboiler is heated by a means for direct heating.

22. The apparatus of claim 21 wherein said means for direct heating is an electrical heater.

23. The apparatus of claim 17 wherein said reboiler is heated by a means for indirect heating.

24. The apparatus of claim 23 wherein said means for indirect heating is an oil or a stream jacketed heater.

* * * * *